United States Patent
Pesahl et al.

(10) Patent No.: US 6,945,105 B2
(45) Date of Patent: Sep. 20, 2005

(54) AIR MASS FLOWMETER WITH CONTROLLED FLOW SEPARATION POSITION

(75) Inventors: Stefan Pesahl, Saal A.D.Donau (DE); Frank Steuber, Bad Abbach (DE); Andreas Wildgen, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/487,653

(22) PCT Filed: Aug. 16, 2002

(86) PCT No.: PCT/DE02/03013

§ 371 (c)(1),
(2), (4) Date: Feb. 20, 2004

(87) PCT Pub. No.: WO03/027615

PCT Pub. Date: Apr. 3, 2003

(65) Prior Publication Data

US 2004/0231405 A1  Nov. 25, 2004

(30) Foreign Application Priority Data

Aug. 28, 2001 (DE) .......................................... 101 41 909

(51) Int. Cl.⁷ ................................................. G01F 1/68
(52) U.S. Cl. .................................................. 73/204.22
(58) Field of Search .......................... 73/204.22, 202.5, 73/204.11, 204.21, 204.25, 204.27

(56) References Cited

U.S. PATENT DOCUMENTS 5,712,425 A * 1/1998 Hecht et al. ................ 73/118.2
6,220,090 B1 * 4/2001 Kohno et al. .................. 73/202
6,336,360 B1 * 1/2002 Weber ..................... 73/204.21

FOREIGN PATENT DOCUMENTS

| DE | 10019149 | 11/2001 |
| DE | 10135142 | 10/2002 |
| EP | 0908704 | 4/1999 |
| EP | 0940657 | 9/1999 |
| GB | 2128754 | 5/1984 |

\* cited by examiner

Primary Examiner—Edward Lefkowitz
Assistant Examiner—Jewel V. Thompson
(74) Attorney, Agent, or Firm—Martin A. Farber

(57) ABSTRACT

An air mass flowmeter, suitable for connection to an air-intake manifold of an internal combustion engine, measures an air mass taken in by the engine. The flowmeter has an air passage consisting of a first channel and a second channel joined by a turning area. An air mass sensor is located in the second channel downstream of the turning area, on an inner wall of the second channel. A flow element is located in the turning area, projects from an inner wall of one of the channel sections towards a curved wall of the turning area to define a point of separation of a stream of air from an inner channel wall upstream of the air mass sensor.

15 Claims, 3 Drawing Sheets

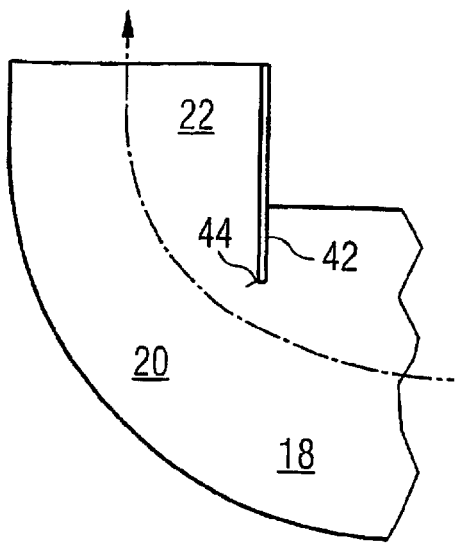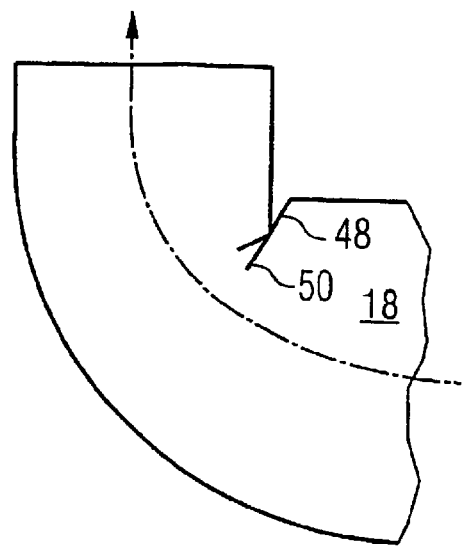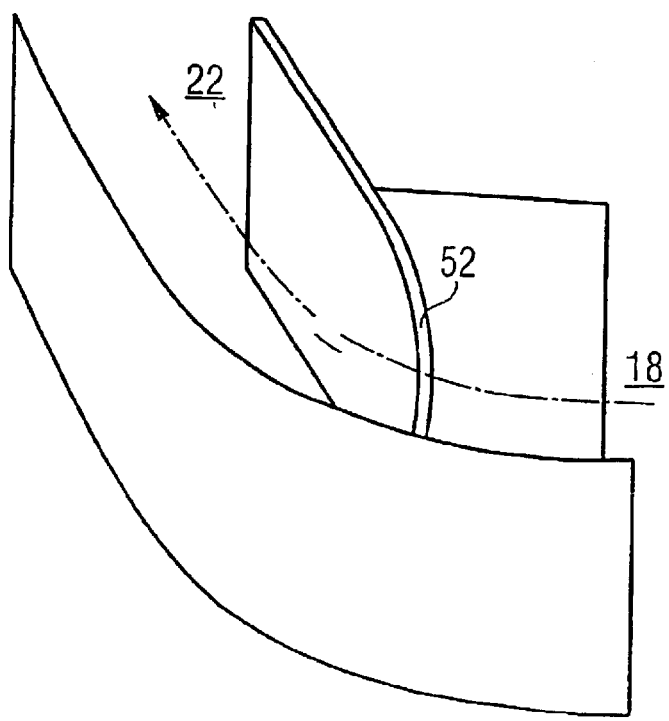

AIR MASS FLOWMETER WITH CONTROLLED FLOW SEPARATION POSITION

FIELD AND BACKGROUND OF THE INVENTION

The invention relates to an air mass flowmeter for measuring the air mass taken in by the internal combustion engine.

Air mass flowmeters in the intake duct or charge duct of the internal combustion engine are known. They serve to measure the mass flow or the intake/charge air, in order to be able to determine and control the mass ratios accordingly during the chemical process of combustion.

An air mass flowmeter is known from EP 0 908 704 A1 that measures the air flow thermally. The air mass flowmeter is arranged with one end in a principal air stream in the intake duct to the internal combustion engine. A specific proportion of the principal air stream is directed into a first channel that leads to an air mass sensor. The air mass sensor determines thermally the air mass passing by it. The air stream is then diverted and channeled back into the principal air stream in order to be fed to the combustion operation. One disadvantage of the known air mass sensor is that the air flow is separated from the inner channel wall. Such separation causes the measurement signals of the downstream air mass sensor to be disturbed. It has proven that the position of the point of separation from the inner channel wall can vary significantly even with strong flows. Even small disturbances to the flow conditions result in major displacement of the position of the point of separation. The changing point of separation from the inner channel wall however results in areas with a separated flow of different sizes and positions.

SUMMARY OF THE INVENTION

The object of the invention is to provide an air mass sensor, with which falsification and influencing of the detected air mass by the separation of the air flow from the inner channel wall are prevented.

The air mass flowmeter according to the invention has a sensor unit arranged in the air flow path to detect the passing air mass. The air mass is directed from a first section of the channel via a turning area into a second section of the channel. In the turning area at least one flow element is provided that projects in the turning area in such a way that the air flow is separated from the inner channel wall. The flow element creaces a defined point of separation or a defined separating edge for the air flow. This solution of using a flow element is based on the consideration that an area with separated flow should not be avoided but that controlled separation should take place at the flow element with a defined position that can be taken into account when calibrating the sensor unit. The flow element and sensor unit are at such a distance from each other that the flow element creates largely defined flow conditions for the sensor unit.

It proves, to be particularly effective to locate a flow element at a turning area that diverts the air flow by approximately 90°. With such a diversion the passing air is separated from the channel wall in the area of the bend. Separation then takes place from the inside of the turning area, i.e. the side facing the central point of the curve of the turning area.

In a possible embodiment of the air mass flowmeter the side walls of the first and second channel sections meet directly or when extended in the turning area. The right angle of the turning area is preferably located on the side facing the central point of the curve of the turning area. The side facing the central point of the curve of the turning area is then referred to as the inside of the turning area.

The flow element preferably comprises an element projecting into the turning area that is secured on the inside to the side wall of one of the channel sections. A plate-shaped insert is preferably provided as the element, projecting into the turning area and secured to the side wall of the preferably, downstream channel section and creating a breaking edge for the air flow with its free end. The plate-shaped insert preferably extends over the entire side wall to which it is secured.

The insert is preferably a metal holder for the sensor unit.

In an alternative embodiment the flow element comprises a barrier surface inclined towards the direction of flow in the first channel section, coining into contact at an acute angle with a downstream wall of the element to form a breaking edge. The element can be configured in a, bar shape with a triangular cross-sectional contour. The element is preferably made of a plastic material. In a preferred arrangement of the flow element in the turning area its downstream wall terminates flush with the side wall of the downstream channel section. Alternatively the element can also be configured as a shaped section of the channel wall projecting into the turning area.

BRIEF DESCRIPTION OF THE DRAWINGS

Preferred embodiments of the air mass flowmeter according to the invention are described in more detail below with reference to the figures, in which:

FIG. 6 shows a top view of the turning area from FIG. 5, FIG. 7 shows a turning area with a triangular flow element as a projection of the channel wall in cross section and FIG. 8 shows a curved breaking edge in the turning area.

DETAILED DESCRIPTION OF THE PREFERRED EMBODIMENT

Figure 1:
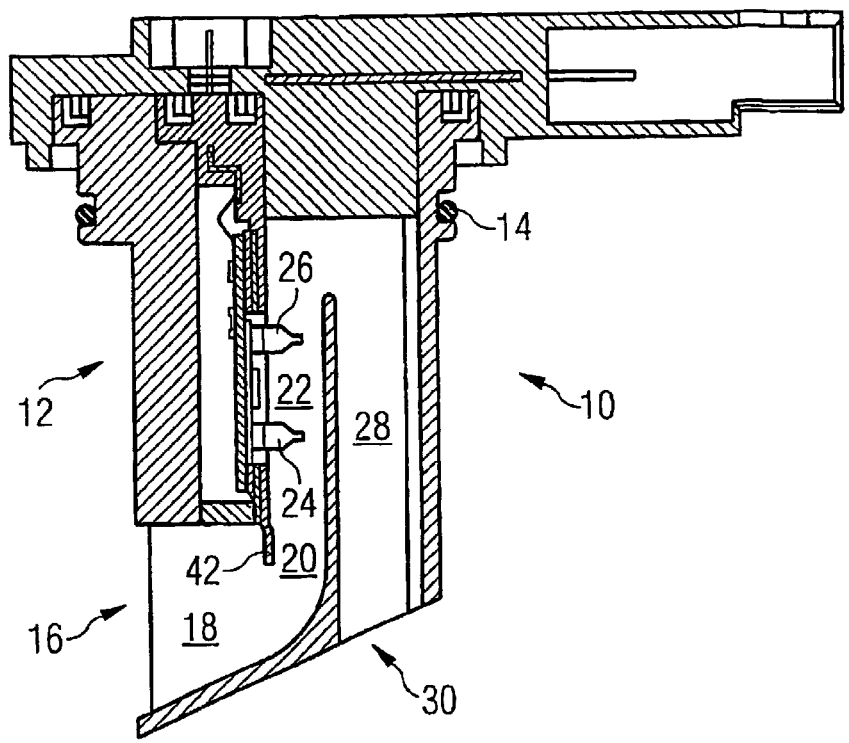
FIG. 1 shows an air mass flowmeter according to the invention with a metal insert as the flow element in cross section.

FIG. 1 shows an air mass flowmeter 10 according to the invention. The air mass flowmeter 10 can be positioned with its end 12 in an intake manifold. The seal 14 hereby seal& the intake manifold off from its environment. The part of the air mass flow sensor 12 located in the intake manifold comprises an inlet opening 16, into which a proportion of the principal air flow flows. A first channel section 18 tapers in a funnel shape. A turning area 20 joins onto the first channel section 18. An ascending channel section 22 is located downstream from the turning area 20. The measuring devices 24, 26 for the passing air are located in the ascending channel section 22. The measurement signals can for example be evaluated according to the principle of constant-temperature hot-film anemometry.

The air flow from the channel section 22 exits via the descending channel section 28 at the opening 30 and re-enters the principal air flow in the intake manifold. The opening 30 is screened by the tapering first channel section from the direct principal air flow so that the principal air flow generates suction at the opening 30 for the exiting air flow.

Figure 3:
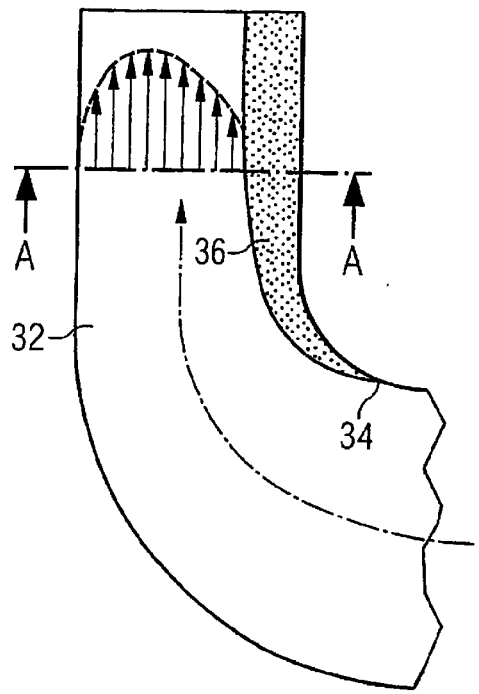
FIG. 3 shows a turning area with a point of separation in the turning area and FIG. 4 shows the turning area from FIG. 3 with the point of separation further downstream.
Figure 4:
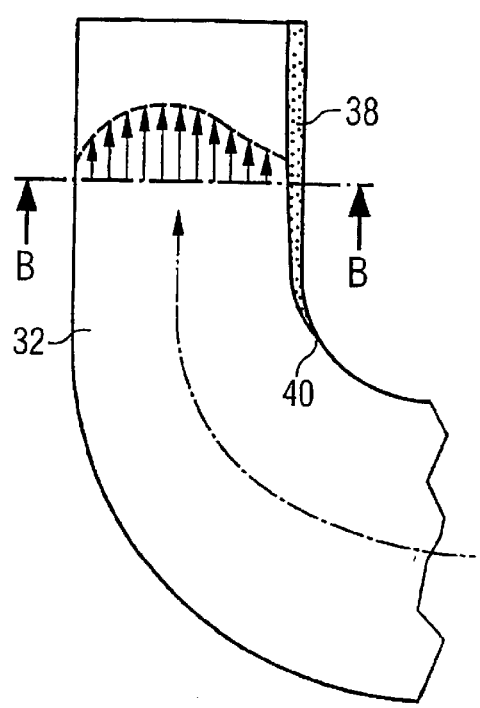

FIGS. 3 and 4 show an air flow in a turning area in a downstream channel section 32. The air flow separates at point 34 from the inner wall of the turning area at the curve. A recirculation area 36 has been formed downstream from the separation point. The speed profile of the air flow along the line A—A is shown as an example in the channel section 32. It can be seen clearly that the speed in the recirculation area 36 rapidly drops to zero. By comparison, FIG. 4 shows a recirculation area 38, the point of separation 40 of which is further downstream than the point of separation 34. The recirculation area 38 has a smaller surface area. Also the proportion of the speed profile along the line B—B, at which the flow speed is zero or approximately zero, is significantly smaller. As the flow speed in the recirculation areas is almost zero, the effective cross-sectional area for the flow is reduced. The reduced cross-sectional area thereby results in a higher flow speed in this cross-sectional area.

Disturbances always occur in the air flow when an air mass flowmeter is used. Disturbances cause displacement of the point of separation 34, 40, which result in clear changes to t-he recirculation area even with small displacements. These changes however bring about a change in the measurement signals so that the detected values are disturbed.

FIG. 1 shows an insertable plate 42, which projects into the turning area 20. The insertable plate 42 then extends further along the inside of the ascending channel section 22. The plate 42 can preferably also be provided as a support for the measuring unit 24, 26, thus ensuring the fitting and positioning of the flow element in relation to the measuring unit.

Figure 5:
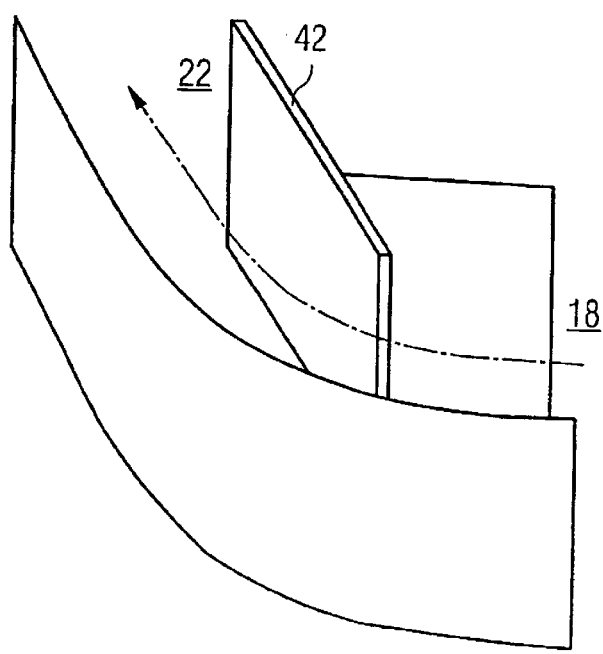
FIG. 5 shows a schematic view of the turning area from FIG. 1 with insert.

During operation the flow comes up against the insert 42 as shown in FIGS. 5 and 6. A recirculation area forms downstream from the insert 42 as a function of the mean flow speed. As the air flow is thereby broken at the defined flow edge 44, the recirculation area is not susceptible to disturbance. The recirculation area formed in FIG. 6 with a corresponding mean flow speed is not shown for purposes of clarity.

Figure 2:
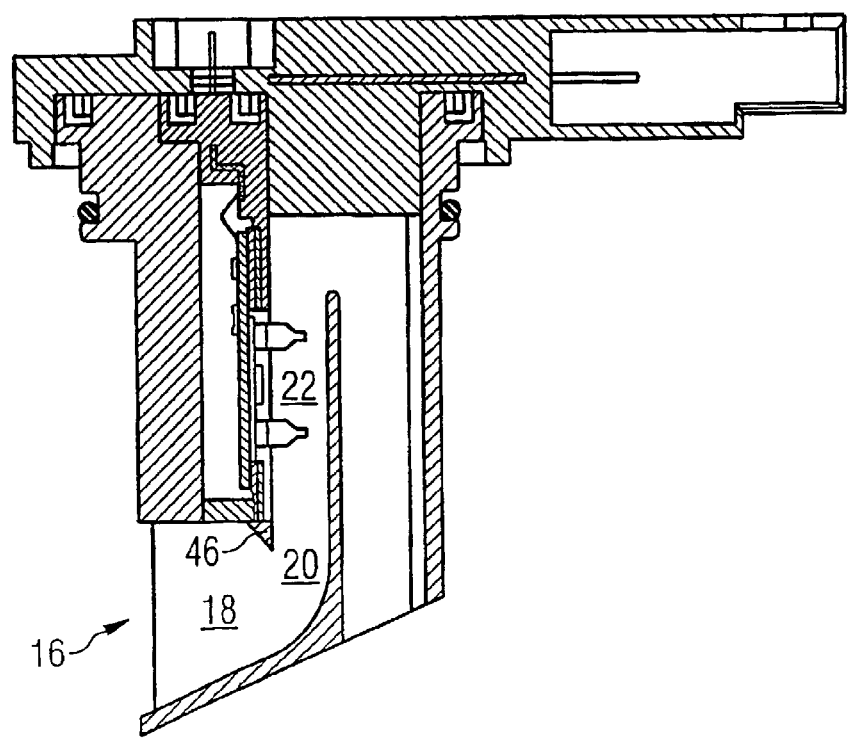
FIG. 2 shows an air mass flowmeter according to the invention with a triangular barrier component in cross section.

FIG. 2 shows an alternative barrier element 46. The flow element 46 has a triangular contour in the cross section shown in FIG. 2. As shown in the drawing, the right-angled triangle is arranged so that the hypotenuse points towards the inlet opening 16 and one of the legs terminates flush with the inner wall of the ascending channel 22.

FIG. 7 shows an alternative embodiment of the triangular barrier element 48 that is provided in the form of a shaped section on the inner wall of the first channel section 113. The flow element 48 comprises a breaking edge 50, which has a similar effect to the breaking edge 44 in FIG. 6.

As shown in FIG. 5, the barrier element can extend across the entire depth of the flow channel. It is however also conceivable that the flow element might only extend across part of the flow channel. The breaking edge can also have an arched form across part or the entire depth of the flow channel. FIG. 8 shows a breaking edge 52, which projects less far into the turning area 20 towards the ends so that the breaking edge has a curved form.

What is claimed is:

1. Air mass flowmeter (10) for measuring an air mass taken in by the internal combustion engine, the flowmeter comprising:
    a sensor unit (24, 26) that detects the mass of air passing by the sensor unit;
    a first and a second channel section (18, 22) that direct an air flow from the first channel section (18) past the sensor unit (24, 26);
    at least one turning area (20), having an inside and an outside with respect to a central point of a curve of the turning area, that connects the first and second channel sections (18, 22) to each other; and
    at least one flow element (42, 46) located at the inside of the turning area (20), and projecting into the turning area to separate the air flow from an inner wall of one of the channel sections upstream from the sensor unit.

2. Air mass flowmeter according to claim 1, wherein the first and second channel sections (18, 20) are perpendicular to each other.

3. Air mass flowmeter according to claim 1, wherein the walls of the first and second channel sections form a right angle directly or when extended.

4. Air mass flowmeter according to claim 1, wherein the flow element is located on a side wall of one of the channel sections forming the inside of the turning area.

5. Air mass flowmeter according to claim 1, wherein the flow element extends completely along the side wall to which it is secured.

6. Air mass flowmeter according to claim 4, wherein the flow element projects to a different degree along its end projecting into the turning area.

7. Air mass flowmeter according to claim 6, wherein the sides of the flow element project less far into the turning area than its center, so that a projecting end of the flow element has a curved form (52).

8. Air mass flowmeter according to claim 4, wherein the flow element comprises a plate-shaped insert (42), and the plate-shaped insert is secured to the side wall of one of the channel sections, and a free end of the plate-shaped insert forms a breaking edge (44) for the air flow.

9. Air mass flowmeter according to claim 8, wherein the plate-shaped insert is made of metal.

10. Air mass flowmeter according to claim 8, wherein the plate-shaped insert holds the sensor unit.

11. Air mass flowmeter according to claim 4, wherein the flow element (46) comprises a barrier surface inclined towards a direction of air flow in the first channel section, the barrier surface meeting a downstream wall of the flow element at an acute angle and forming a breaking edge (50) for the air flow.

12. Air mass flowmeter according to claim 11, wherein the flow element (46) is configured as a bar shape with a triangular cross-sectional contour.

13. Air mass flowmeter according to claim 12, wherein the flow element is made of a plastic material.

14. Air mass flowmeter according to claim 13, wherein the flow element terminates flush with the side wall of the downstream channel section in the turning area.

15. Air mass flowmeter according to claim 4, wherein the flow element is formed by a shaped section (48) of an inner channel wall.

\* \* \* \* \*